(12) United States Patent
Moravec et al.

(10) Patent No.: US 9,964,147 B2
(45) Date of Patent: May 8, 2018

(54) MAGNETIC BEARING, SHAFT AND SHAFT MONITORING FOR A SPINNING ROTOR OF AN OPEN-END SPINNING MACHINE

(71) Applicant: Rieter CZ s.r.o., Usti nad Orlici (CZ)

(72) Inventors: Milan Moravec, Usti nad Orlici (CZ); Jiri Sloupensky, Usti nad Orlici (CZ); Siegfried Silber, Kirchschlag (AT); Andreas Josef Pröll, St. Gotthard (AT); Peter Dirnberger, St. Florian (AT)

(73) Assignee: Rieter CZ s.r.o., Usti nad Orlici (CZ)

( * ) Notice: Subject to any disclaimer, the term of this patent is extended or adjusted under 35 U.S.C. 154(b) by 320 days.

(21) Appl. No.: 14/675,148

(22) Filed: Mar. 31, 2015

(65) Prior Publication Data
US 2015/0275964 A1    Oct. 1, 2015

(30) Foreign Application Priority Data
Mar. 31, 2014   (DE) .................. 10 2014 104 531

(51) Int. Cl.
*F16C 32/04*    (2006.01)

(52) U.S. Cl.
CPC .......... *F16C 32/048* (2013.01); *F16C 32/047* (2013.01); *F16C 32/0465* (2013.01); *F16C 32/0487* (2013.01); *F16C 2340/18* (2013.01)

(58) Field of Classification Search
CPC .... F16C 32/04; F16C 32/044; F16C 32/0444; F16C 32/0446; F16C 32/046;
(Continued)

(56) References Cited

U.S. PATENT DOCUMENTS

| 4,652,780 A | 3/1987 | Murakami et al. |
| 4,918,345 A * | 4/1990 | Vaillant de Guelis ................... F16C 32/0459 104/281 |

(Continued)

FOREIGN PATENT DOCUMENTS

| DE | 10 2005 030 724 A1 | 1/2007 |
| DE | 10 2006 053 734 A1 | 5/2008 |

(Continued)

OTHER PUBLICATIONS

German Patent Office Search Report, dated Dec. 11, 2014.
Extended European Search Report, dated Jan. 15, 2016.

*Primary Examiner* — Tran Nguyen
(74) *Attorney, Agent, or Firm* — Dority & Manning, P.A.

(57) ABSTRACT

A magnetic bearing for the mounting of a shaft, in particular for a spinning rotor of an open-end spinning device, features several pole shanks of a stator for the active radial magnetic mounting of the shaft in two degrees of freedom, which in each case are surrounded by a coil and are radially arranged to each other, in such a manner that they define an opening for the shaft. In the area of the opening, the pole shanks are connected to each other. For the passive axial mounting of the shaft, at least one permanent magnet is arranged between the coils and the opening. The invention also includes a shaft for mounting with at least one corresponding magnetic bearing. The shaft is a composite component, which at least partially consists of non-ferromagnetic material. In the area of the radial and axial mounting, a component made of a ferromagnetic material is arranged. A shaft mounting is also provided and features, for the passive axial mounting of one degree of freedom of the shaft and for the active radial mounting of two degrees of freedom of the shaft, at least one, preferably two, corresponding magnetic bearings.

30 Claims, 5 Drawing Sheets

(58) Field of Classification Search
CPC ............... F16C 32/0465; F16C 32/047; F16C 32/0482; F16C 32/0487; F16C 32/048; F16C 32/0493; F16C 39/06
USPC ........................................................ 310/90.5
See application file for complete search history.

(56) References Cited

U.S. PATENT DOCUMENTS

| | | |
|---|---|---|
| 5,385,007 A | 1/1995 | Hartel et al. |
| 5,550,413 A * | 8/1996 | Bernus ................ F16C 32/0444 310/114 |
| 5,880,546 A | 3/1999 | Marroux et al. |

FOREIGN PATENT DOCUMENTS

| | | | |
|---|---|---|---|
| EP | 724086 * | 7/1996 | ............ F16C 39/04 |
| EP | 0 795 950 A1 | 9/1997 | |
| EP | 1 939 473 A1 | 7/2008 | |
| JP | 2000205260 A | 7/2000 | |
| WO | WO 93/05310 | 3/1993 | |

* cited by examiner

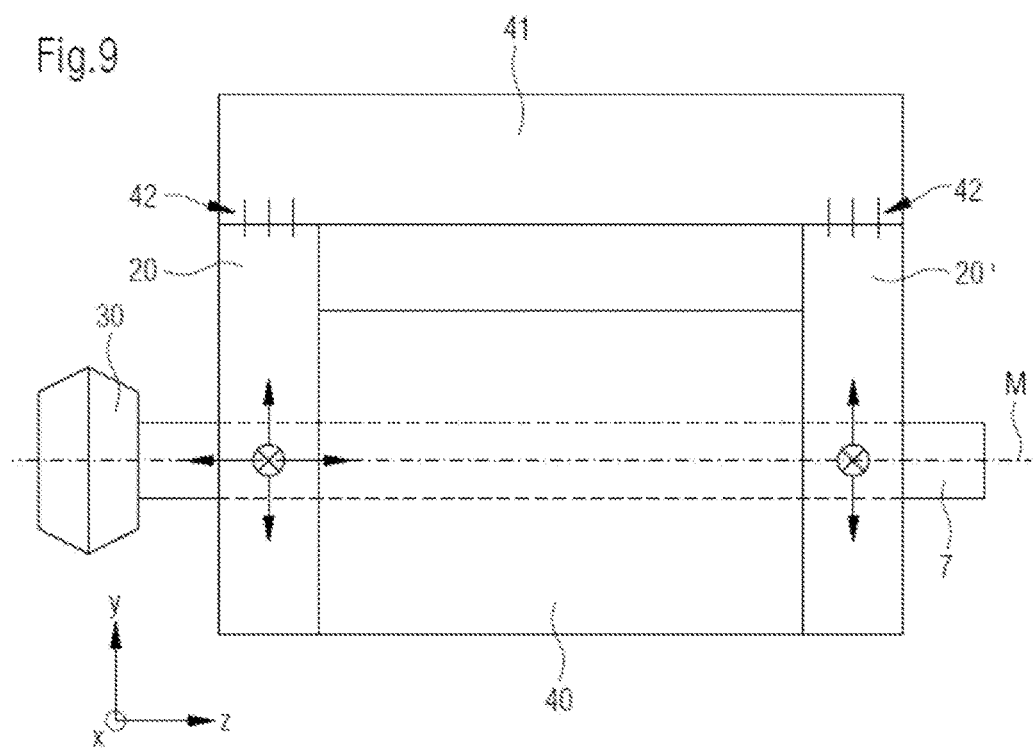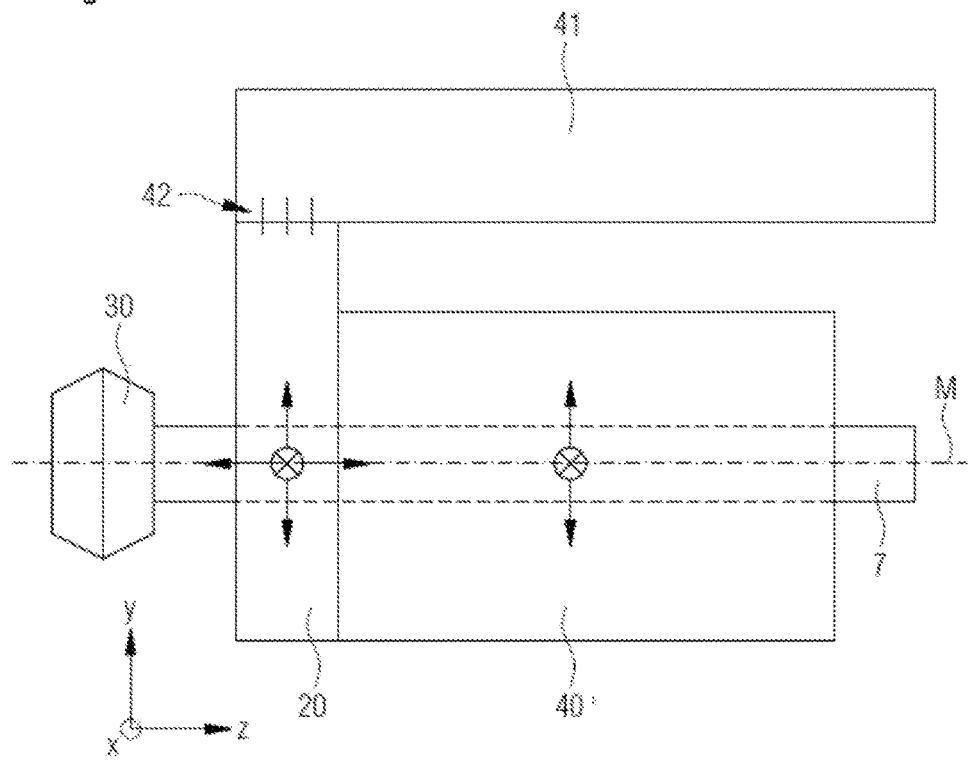

MAGNETIC BEARING, SHAFT AND SHAFT MONITORING FOR A SPINNING ROTOR OF AN OPEN-END SPINNING MACHINE

FIELD OF THE INVENTION

The present invention relates to a magnetic bearing for the mounting of a shaft, in particular for a spinning rotor of an open-end spinning device, which features several radially arranged pole shanks of a stator, each of which is surrounded by a coil, for the active radial magnetic mounting of the shaft in two degrees of freedom. The pole shanks are arranged in such a manner that they release an opening for the shaft, along with a shaft for mounting with at least one corresponding magnetic bearing and a shaft mounting, in particular for a rotatable shaft of a spinning rotor in an open-end spinning device with such a magnetic bearing.

BACKGROUND

A rotor drive of an open-end spinning device is known from DE 10 2006 053 734 A1. The rotor drive drives a shaft and a spinning rotor arranged on it. The shaft is part of one armature of the rotor drive and is magnetically mounted on both sides of the rotor drive. The mounting takes place by means of each of the two permanent magnet rings and one magnetic bearing coil that can be energized in a defined manner. With these elements and an inductive sensor, the axial position of the spinning rotor that is free-floating in operation is controlled. In this manner, the axial position of the shaft, and thus the spinning rotor, can be successfully determined with relative success, and adhered to. However, the radial position of the shaft and the spinning rotor thereby moves within a relatively large tolerance. However, in order to be able to spin a uniform and uninterrupted thread, the radial position of the spinning rotor is extremely important.

A radial magnetic mounting is known from WO 93/05310 A1. A shaft is arranged between pole shanks of a stator, which are surrounded by a coil. The shaft is radially centered and held by a magnetic field between the coils. The mounting and centering may be effected by means of an active control system.

SUMMARY OF THE INVENTION

A task of the present invention is to mount a shaft by means of a magnetic bearing, whereas the shaft is held in a defined position both axially and radially, and can be used in particular for a spinning rotor of an open-end spinning device with very high speeds, such as 200,000 revolutions per minute. Thereby, the mounting can fulfill the requirements for the exact position of the spinning rotor, in order to be able to spin a uniform and uninterrupted thread. In addition, the mounting must be able to perform reliably even under the dusty conditions of a spinning mill. Additional objects and advantages of the invention will be set forth in part in the following description, or may be obvious from the description, or may be learned through practice of the invention.

The tasks are solved with a magnetic bearing, a shaft and a shaft mounting with the characteristics described herein.

The magnetic bearing in accordance with the invention serves the purpose of mounting a shaft, in particular for a spinning rotor of an open-end spinning device. For the active radial magnetic mounting of the shaft in two degrees of freedom, the magnetic bearing features several radial pole shanks of a stator, each of which is surrounded by a coil. The pole shanks are arranged relative to each other in such a manner that they release an opening for the shaft. In the area of the opening, and on the side of the coils turned away from the opening, the pole shanks are connected to each other.

For the passive axial mounting of the shaft, at least one permanent magnet is arranged between the coils and the opening; this is in operative connection with the pole shanks. Through the magnetic mounting in accordance with the invention, an active radial magnetic mounting and a passive axial magnetic mounting of the shaft are effected. In particular, the radial position of the shaft is adjustable and controllable with a high degree of precision. The axial mounting of the shaft is effected on a passive basis. The at least one permanent magnet provided for this purpose uses the pole shanks and the shaft for maintaining an axial positioning of the shaft. Through the resulting force, the magnetic flux that is achieved by the permanent magnets holds the shaft in its axial position with a high degree of precision. In order to generate a force in a radial direction, two opposing coils are energized. Thereby, the magnetic flux crosses an air gap between the corresponding pole shanks and the shaft, and thus closes the yoke that connects the pole shanks on the side of the coils turned away from the opening. Thereby, on the one hand, the magnetic flux of the coil is added to the magnetic flux of the permanent magnet, and, on the other hand, the magnetic flux of the coil is subtracted from the flux of the permanent magnets. Thereby, the flux of the permanent magnet does not cross the electromagnetic flux of the coil. Thereby, the mounting may work very effectively, for example, with lower current heat losses.

In an advantageous design, four pole shanks are provided; these are connected to a stator cross. Thereby, each of the two opposing pole shanks work together with their coils in such a manner that they generate a magnetic flux, which runs along the opposing pole shanks and the external connection of the pole shanks.

Advantageously, the external connection of the pole shanks is a stator ring, which connects the pole shanks on the side of the coils turned away from the opening. Thereby, the stator ring enables the corresponding power flow, which allows an interaction between the two opposing pole shanks and their coils. Each of the two opposing pole shanks with their coils holds the shaft in a mounted manner in one degree of freedom. The shaft is radially held in two degrees of freedom through the cross-shaped arrangement of the four pole shanks.

It is particularly advantageous that the pole shanks are connected to each other in the area of the opening for the shaft with thin, for example 0.5 to 1 mm wide, saturation bars. This saturation bar that connects neighboring pole shanks to each other cause the eddy current losses to be minimized, since the distribution of the flux density in the air gap between the stator and the shaft is very homogeneous. The saturation bars are arranged directly at the gap between the pole shanks and the shaft located in the opening. Through a second saturation bar, which is arranged in a spaced manner at the first saturation bar, high mechanical stability is given over to the magnetic bearing, because the pole shanks are thereby held together with stability. The saturation bars advantageously feature a width that is so small that they are almost completely saturated by the magnetic flux of the permanent magnets. The saturation bars give rise to a main flux between the stator cross and the shaft located between them and not around the shaft. Punched out slots between the pole shanks generate two thin saturation bars.

The permanent magnet that is provided for the radial active mounting and axial passive mounting of the shaft is preferably a ring that surrounds the opening. Thereby, several rings may also be provided, for example, such that one permanent magnet ring is arranged on one side of the stator and, viewed in an axial direction of the shaft, the other permanent magnet ring is arranged on the other side of the stator. Alternatively, it can be provided that several magnets are arranged around the opening in a ring shape. The permanent magnet ring generates a magnetic flux that can position the shaft in an axial direction.

If the radial distance of the permanent magnet(s) from the center of the opening is larger than the radius of the opening, this gives rise to a gap between the permanent magnets and the shaft, which is larger than the gap between the stator and the shaft. This design supports the axial magnetization for better control of the direction of flux of the permanent magnets.

If the permanent magnet(s) is/are allocated to the side of a guide ring turned away from the pole shank for the guiding of the magnetic flux, it is possible that the magnetic flux is guided, from the permanent magnets, along the guide ring. Through the guide ring, the magnetic flux can be introduced through an air gap in the shaft, and can be led back through an additional air gap and the stator to the permanent magnets.

If the inner diameter of the guide ring is essentially equal to the diameter of the opening of the pole shanks for the shaft, on the one hand, the magnetic flux can be guided in a targeted manner. On the other hand, it is also possible that the shaft from both sides can be brought into the bearing and brought out once again from the bearing, in order to correspondingly mount both components.

If a gap is provided in an axial direction of the shaft between the pole shanks and the guide ring, this also serves the purpose of the guiding of the magnetic flux of the permanent magnet.

If the gap between the pole shanks and the guide ring is largely filled out with a filling ring, in particular one that is made of plastic, this serves the purpose of, in particular, stabilizing the mechanical design and the fastening of the pole shank, permanent magnet and guide ring with each other.

If sensors and a control device are allocated to the coils, in order to actively control the two radial degrees of freedom of the shaft, the position of the shaft with respect to its two radial degrees of freedom is adhered to with a high degree of accuracy. Even small deviations of the shaft from its intended central position lead to the fact that the sensors detect this deviation and, through a control device, the coils are correspondingly more or less energized, in order to create a balance for the position of the shaft.

Preferably, with the pole shanks, the permanent magnets, and the guide ring, a ferromagnetic component, in particular a ring in operative connection, is firmly connected to the shaft. This closes the magnetic flux through the permanent magnets, the guide ring, the ferromagnetic component and the pole shanks. The axial fixing of the shaft is thus achieved with stability. An axial swerving of the shaft gives rise to an increased force, which causes the shaft, with its ferromagnetic component, to return once again to the equilibrium position, which corresponds to the desired axial position of the shaft.

If the thickness or wall thickness of the pole shanks is less than the width of the guide ring turned towards the ferromagnetic component, a particularly advantageous magnetic flux is achieved; this ensures the stable position of the shaft in its axial position, since, through the wider guiding ring, the flux density under the guide ring is smaller than that in the air gap of the stator.

If the ferromagnetic component features a groove turned towards the permanent magnets, this also serves the purpose of adherence to a stable axial position of the shaft, since, thereby, the magnetic flux influences the position of the shaft with particular strength. Thereby, the pole shanks and the guide ring fix the shaft more strongly in its intended axial position.

Advantageously, the groove is arranged in the ferromagnetic component between the pole shanks and the guide ring. Both the guide ring and the pole shanks have a stabilizing effect on the shaft in both axial directions.

In a particularly advantageous design of the magnetic bearing, the stationary components of the magnetic mounting are arranged on a carrier and form one compact structural unit. The structural unit may be easily mounted and quickly replaced when necessary.

If the magnetic bearing is provided with covers for protection from dirt and as a subcarrier for the fastening of individual components of the magnetic mounting, this is advantageous for a largely trouble-free operation of the magnetic bearing even in a particularly dusty environment, as expected for use in spinning machinery. The cover may be formed as a lid, and the subcarrier may be formed as guide rods.

If the structural unit features a circuit board for the attachment of the sensors and/or an electronics assembly for the control of the radial magnetic mounting of the shaft, a very compact design of the structural unit may be advantageously achieved.

If, in an advantageous manner, the circuit board features a plug connection, with which the circuit board is connected to a superordinate circuit board for control and power supply, a compact design of the magnetic bearing is also thereby to be achieved. Thus, cable connections between the individual circuit boards may be avoided.

If a shielding plate is arranged between the coils and the circuit board, this ensures that no electromagnetic interference from the coils can interfere with the electronics assembly of the circuit board.

A shaft in accordance with the invention is provided for mounting with at least one magnetic bearing, with one or more of the characteristics described above. Herein, the shaft is a composite component, which at least partially consists of non-ferromagnetic material. The non-ferromagnetic material may be metal, such as stainless steel or aluminum, or non-metal, such as glass-fiber-reinforced plastic or carbon-fiber-reinforced plastic, or a different composite material. In the area of the radial and (if applicable) axial mounting, a component made of a ferromagnetic material is arranged on the shaft. The ferromagnetic material serves to guide the magnetic flux for the axial and the radial mounting of the shaft through the magnetic bearing. It ensures a targeted magnetic flux, which can hold the shaft in its radial and axial position. In particular, through the demarcation of the ferromagnetic and non-ferromagnetic material on the shaft, the axial mounting of the shaft is to be effected in a particularly advantageous manner. The border between the ferromagnetic and non-ferromagnetic material ensures a corresponding positioning vis-à-vis a permanent magnet and, if applicable, a guide ring and the pole shanks. With its ferromagnetic material, the shaft is to be held with a high degree of precision in the area of such components of the magnetic bearing.

If the component made of ferromagnetic material features a circumferential groove, this serves the purpose of the stiff axial fixing of the shaft vis-à-vis the magnetic bearing, since the magnetic flux can have targeted effects on the component and thus the shaft.

If the groove is arranged off-center of the area of the axial mounting, a particularly favorable magnetic flux is achieved; this in turn contributes to the stability of the axial mounting of the shaft.

If the component made of ferromagnetic material is designed in the form of a ring or a pin, the shaft may thereby be manufactured and assembled as a composite component in a very easy manner.

If a rotor pot is arranged at one end of the shaft, the shaft may be used as a shaft of an open-end spinning rotor.

One of the advantages of the shaft and the associated magnetic bearing is that the shaft may be formed essentially as a cylinder, without having major differences in diameter. Moreover, the rings and pins made of ferromagnetic material on the shaft may largely correspond to the remaining outer diameter of the shaft. This enables a very easy assembly and disassembly of the shaft in and out of the magnetic bearing. As with the state of the art for spinning rotors, large disk-like protrusions of the shaft are not necessary.

A shaft mounting in accordance with the invention is provided in particular for a rotatable shaft of a spinning rotor in an open-end spinning device. The shaft mounting in accordance with the invention features, for the passive axial mounting of one degree of freedom of the shaft and for the active radial mounting of two degrees of freedom of the shaft, at least one, preferably two, magnetic bearings with one or more of the characteristics described above. In particular, if the magnetic bearing is formed as a compact structural unit, a very advantageous shaft mounting is thereby created. Preferably, a drive motor is arranged between the two magnetic bearings; this transmits a drive torque on the shaft. Through the corresponding arrangement of the two magnetic bearings with a drive motor arranged between them, a design that is compact and protected from dirt is created.

If the shaft mounting advantageously features two magnetic bearings, whereas a first of the two magnetic bearings is formed according to one or more of the preceding claims and the second magnetic bearing is formed solely for the radial magnetic mounting of the shaft, i.e. does not feature any permanent magnets for the axial mounting of the shaft, a very easily producible and cost-effective design of the shaft mounting is created. Such a shaft mounting is sufficient, if requirements that are too high are not made on the axial positioning of the shaft.

If the shaft mounting features a single magnetic bearing with one or more of the characteristics described above and the additional radial support of the shaft is effected by means of a drive motor, which may also generate radial forces for the drive torque, it is also frequently the case that a sufficiently stable mounting of the shaft is thereby maintained.

Preferably, the magnetic bearing is arranged in a compact structural unit, and is thus a part of the shaft mounting. Thereby, the assembly and interchangeability of the shaft mounting is very easy.

For the control and power supply of the magnetic bearing structural units, it is particularly advantageous if integrated circuit boards are connected through plug connections to a superordinate circuit board for control and power supply. These plug connections are preferably designed without wires arranged between them. This largely avoids damages to the wires or even electromagnetic interference.

BRIEF DESCRIPTION OF THE DRAWINGS

Additional advantages of the invention are described in the following embodiments. The following is shown:

FIG. 9: an additional variant of a shaft mounting with a rotor; and

FIG. 10: an additional variant of a shaft mounting with a rotor.

DETAILED DESCRIPTION

Figure 1:
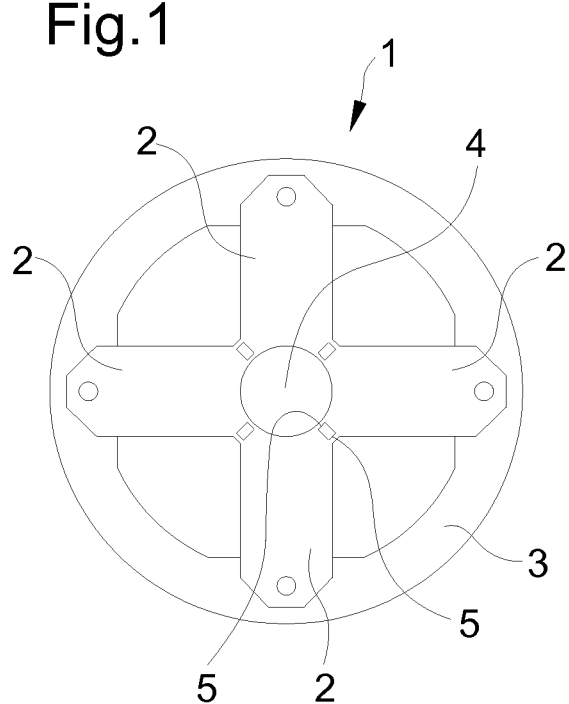
FIG. 1: a stator.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a stator 1, which features four pole shanks 2, which are connected to each other as a stator cross. A stator ring 3 is arranged at the outer end of the pole shanks 2; this surrounds all of the pole shanks 2. At the other end of the pole shanks 2, an opening 4 is provided; this is able to accommodate a shaft that is not shown here. The pole shanks 2 are connected to each other at their inner ends by means of saturation bars 5. A first saturation bar 5 is arranged near the opening 4, while a second saturation bar 5 is provided at a greater distance from the opening 4. Each of the two saturation bars 5 connects two adjacent pole shanks 2. The saturation bars 5 are designed in such a manner that the coil flux essentially does not flow through the saturation bars 5 or between the adjacent pole shanks 2 arranged between them, but through the shaft arranged in the opening 4. A pre-magnetizing flow through a permanent magnet would generate eddy currents in the shaft and thus losses, without the saturation bars 5 through the non-homogeneous distribution of the flux density in the air gap. With suitable dimensioning, the saturation bars bring about a homogeneous distribution of the flux density generated by a permanent magnet 10 (FIGS. 3 and 4), such that ferromagnetic solid material (reference) can be used in the shaft. Thus, the saturation bars 5 are used for an optimal magnetic flux on the one hand and the stability of the stator cross on the other hand.

The stator 1 is made of two parts, each of which consists of laminated steel sheets. The first part is the stator cross made of the four pole shanks 2, and the second part is the stator ring 3. Both parts are connected to each other, for example by means of pressing.

Figure 2:
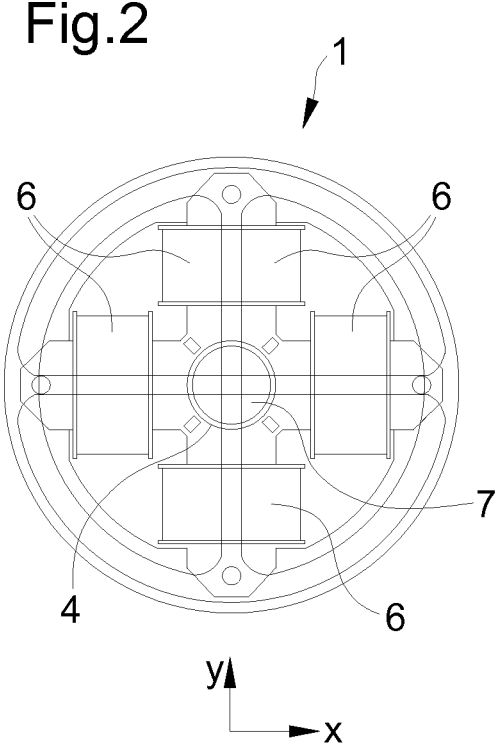
FIG. 2: the stator from FIG. 1 with coils on the pole shanks of the stator.

FIG. 2 shows the stator 1 from FIG. 1 with mounted coils 6. A coil 6 is plugged into each pole shank 2 of the stator cross. Then, the stator cross of the four pole shanks 2 is connected to the stator ring 3. This creates a stable unit, which is suitable for the radial mounting of a shaft 7 protruding through the opening 4.

If the coils 6 are provided with current, this gives rise to a magnetic coil flux, which can be used for the active positioning of the shaft 7 in its radial position. For the generation of forces, the opposing coils 6 are energized simultaneously, but in different directions. This gives rise to magnetic coil fluxes, as depicted in FIG. 2. The overlying mounting of the coil flow with the permanent magnetic flux brings about an increase in the flux density on one side of the shaft, along with a reduction in the flux density on the opposing side and thus a force acting on the shaft. Given the fact that each of the two coils 6 is aligned on one axis, and the two other coils 6 are aligned at right angles to this in another axis, the shaft 7 is mounted in its two degrees of freedom in the x-direction the and y-direction.

Through the saturation bars 5, the coil flow runs essentially through the shaft 7 (as indicated by the flow lines in FIG. 3), and a force on the shaft 7 is generated. The position of the shaft 7 inside the opening 4 is affected by a change to the current. This control is effected with sensors to be described in detail below, which detect the position of the shaft 7 and may thus calculate the necessary current for the coils 6, in order to take the shaft back into the desired position.

Figure 3:
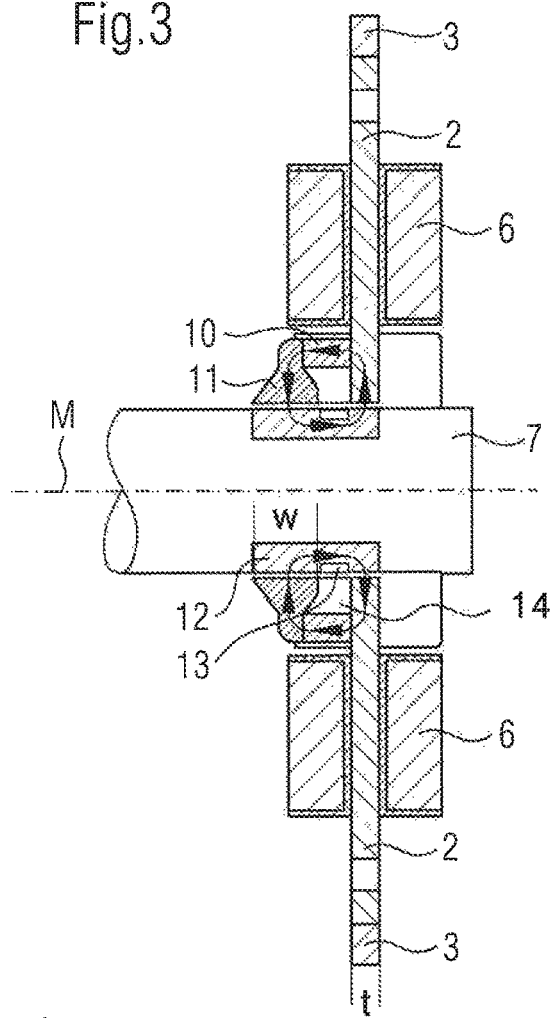
FIG. 3: a sectional view through a radial and axial magnetic bearing in accordance with the invention.

FIG. 3 shows a section through a magnetic bearing in accordance with FIG. 2, which also features a radial bearing and an axial bearing. The radial bearing consists of, among other things, the pole shanks 2 shown here, and the coils 6 attached thereto. At the pole shanks 2, a permanent magnet 10 is arranged between the coils 6 and the shaft 7. The permanent magnet 10 is designed in a ring shape, and thus surrounds the shaft 7 and is magnetized in an axial direction.

At the end turned away from the pole shanks 2, a ferromagnetic guide ring 11 is arranged on the permanent magnets 10. The guide ring 11 features a larger width than the pole shanks 2. Thereby, the flux density in the air gap in the area of the guide ring is much smaller than in the air gap of the stator 1. This in turn has advantageous effects on the negative stiffness of the bearing and improves controllability. The inner diameter of the guide ring 11 essentially corresponds to the diameter of the opening 4 of the stator cross. Between the inner diameter of the guide ring 11 and the opening 4 of the stator cross and the shaft 7, there is a small gap, which enables the contactless rotation of the shaft 7 around its center line M.

The shaft 7 is made of a non-ferromagnetic material. A ring 12 is arranged on the shaft 7 and firmly connected to it. The ring 12 consists of a ferromagnetic material. This ring 12 is allocated to the guide ring 11 and the stator cross, i.e. the front sides of the four pole shanks 2. The permanent magnets 10 give rise to a magnetic flux, which runs through the guide ring 11 in the ring 12 and through the pole shanks 2 back to the permanent magnets 10 (as indicated by the flow lines in FIG. 3). If, in axial direction, the shaft 7 attempts to arrive from the provided position, the permanent magnetic flux causes the shaft 7 to, as far as possible, remain in its axial position.

Through a groove 13 inserted in the ring 12, which is turned towards the permanent magnets 10, the axial stabilization of the shaft 7 is improved. A deviation of the shaft 7 in an axial direction thereby leads to a reinforced resetting force, which attempts to hold the shaft 7 in its axial position. The axial mounting is passive; i.e., no control of the position takes place. Thus, the axial position is self-adjusting in reference to the pole shanks 2 and the guide ring 11, along with the ring 12 of the shaft 7 allocated to them.

Figure 4:
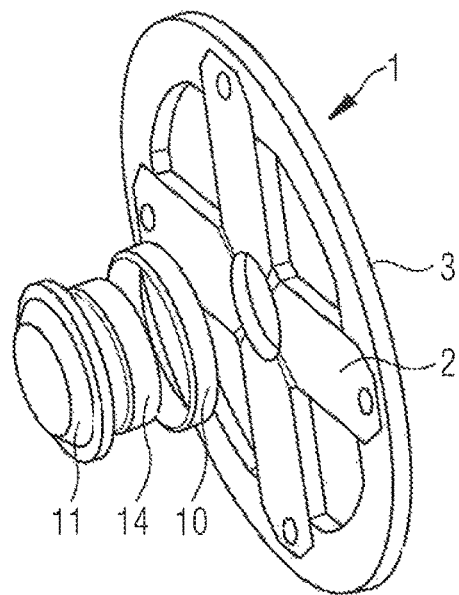
FIG. 4: a perspective exploded view of the axial magnetic bearing in accordance with the invention.

FIG. 4 shows a perspective exploded view of the stator 1 with the passive axial mounting. It is apparent from this that the permanent magnet 10 is formed in a ring shape. It also shows the guide ring 11, which is arranged on the permanent magnet 10 in an assembled condition. In the embodiment shown here, a filling ring 14 is provided between the permanent magnets 10 and the guide ring 11. The filling ring 14 is not essential for the functioning of the bearing, but nevertheless leads to a greater stability of the axial bearing. The filling ring 14 is made of plastic or non-ferromagnetic material, in order to not affect the magnetic flux lines.

Figure 5:
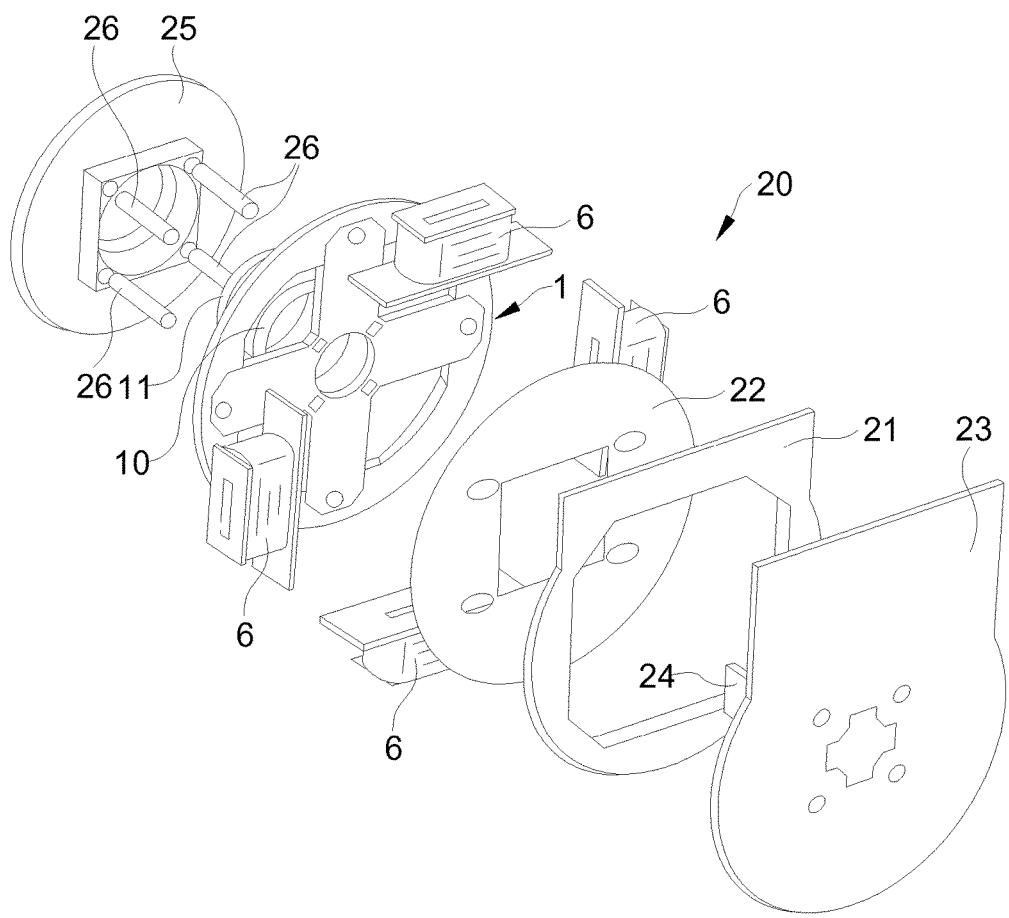
FIG. 5: a perspective exploded view of a structural unit of a radial and axial magnetic bearing in accordance with the invention.

FIG. 5 shows a perspective exploded view of a compact structural unit 20 of the radial and axial bearing. The core of the structural unit 20 forms the stator 1 described above and its coils 6 along with the permanent magnet 10 and the guide ring 11. In this view, the coils are not attached to the pole shanks 2. A shielding plate 22 is provided between the radial bearing and a carrier 21, which fastens the structural unit 20 on the machine frame or motor. The shielding plate 22 closes the structural unit 20 and serves the purpose of shielding electromagnetic radiation from a circuit board 23.

An electronics assembly that is not shown is arranged on the circuit board 23; this is provided for the operation of the radial mounting. Moreover, a sensor 24 is arranged on the circuit board 23; this sensor 24 monitors the position of the shaft 7. In the example shown here, the sensor 24 consists of four eddy current sensors integrated on printed circuit boards, which can determine the distance to the shaft 7. A plug connection that is not shown here is provided on the circuit board 23; with this, the circuit board 23 may be plugged into an additional circuit board for the control and power supply of the shaft mounting, which is explained below.

The structural unit 20 is held together by a lid 25 provided on the end of the structural unit 20 opposing the circuit board 23 and by fixing pins 26 which protrude through the structural unit 20. The lid 25 and the circuit board 23 are plugged into each other with the components arranged between them, and are braced by means of the fixing pins 26, in order to thus form a compact structural unit 20.

Figure 6:
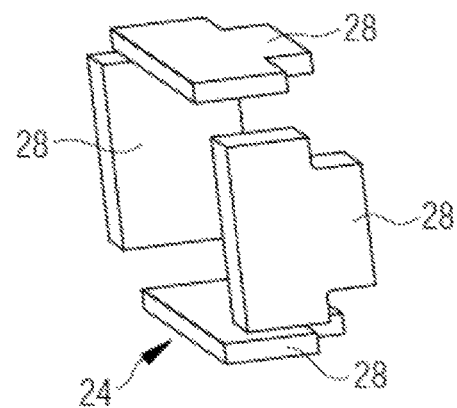
FIG. 6: a perspective view of an array of sensors.

The sensor 24 is schematically shown in FIG. 6. The sensor 24 consists of four printed circuit boards 28, which are arranged around the shaft 7. Each of the eddy current sensors integrated on the printed circuit boards 28 features a coil that is traversed by high-frequency alternating current. At this, eddy currents are induced in the shaft 7, by which the alternating current resistance of the coil changes. The distance between the shaft 7 and the sensor coil is proportional to an electrical signal that is generated by the change in impedance. This electrical signal is monitored. As soon as the signal changes, through a control of the current in the coils 6, the mounting causes the shaft 7, as much as possible, to be held centrally between the printed circuit boards 28.

Figure 7:
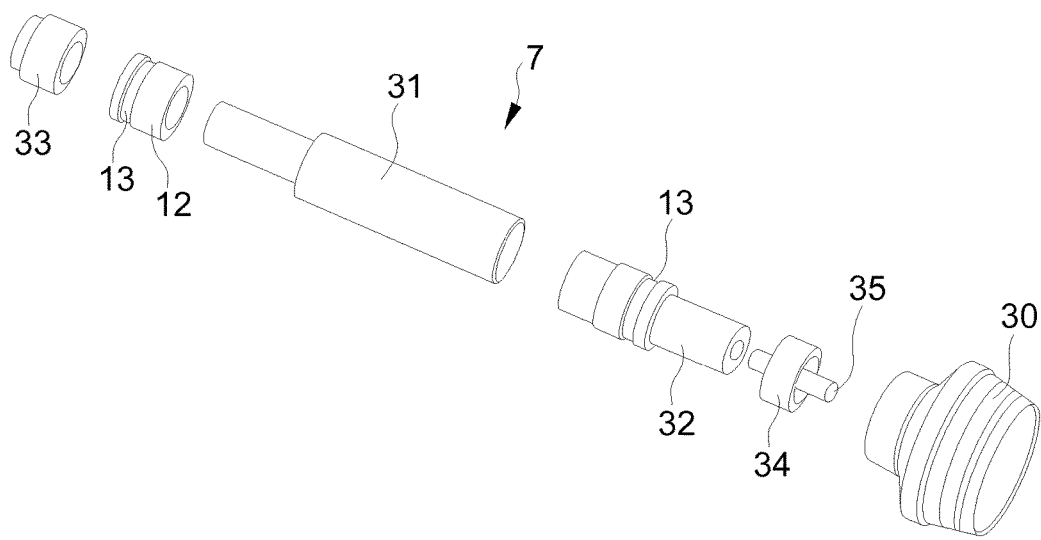
FIG. 7: a perspective exploded view of a shaft with a spinning rotor.

FIG. 7 shows an exploded view of a spinning rotor with a shaft 7 and a spinning pot 30. The shaft 7 is a composite shaft, which consists of a central, non-ferromagnetic retainer 31. The retainer 31 receives the ring 12 on the one hand and a pin 32 on the other hand. Both the ring 12 and the pin 32 feature the groove 13, with which, together with the ring 12 and the pin 32, the axial mounting of the shaft 7 is effected.

The ring 12 and the pin 32 are made of ferromagnetic material. The retainer 31 is closed by a non-ferromagnetic cap 33. A non-ferromagnetic sleeve 34 is attached to the pin 32. Each of the cap 33, the retainer 31 and the sleeve 34 creates a non-ferromagnetic closure vis-à-vis the ring 12 or the ring-shaped section of the pin 32, by which an axial fixing of the shaft 7 vis-à-vis the permanent magnet 10 and the guide ring 11 is effected. A fastening element 35 that is schematically shown here is also provided in the pin 32; with this, the spinning pot 30 can be connected to the pin 32 and thus to the shaft 7.

Figure 8:
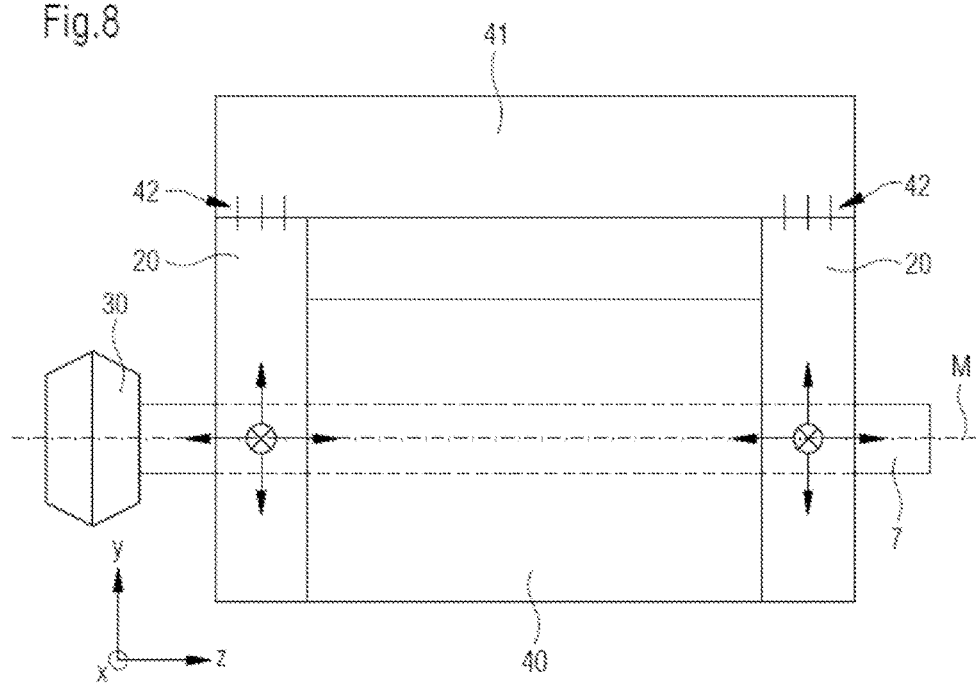
FIG. 8: a schematic view of a shaft mounting with a rotor.

FIG. 8 schematically shows the structure of a shaft mounting with a motor 40. The shaft 7 protrudes through two structural units 20 and the motor arranged between them. Each of the structural units 20 is able to magnetically mount the shaft 7, both in an active radial manner in two degrees of freedom, and in a passive axial manner in one degree of freedom. The bearing directions are indicated with arrows. The motor 40 generates a drive rotation of the shaft 7, with which the spinning pot 30 is installed in rotation around the center line M. The structural units 20 are electrically connected to a control unit 41 through the plug connections 42. The control unit 41 serves the purpose of controlling the motor 40 and the mounting, along with their power supply.

FIG. 9 shows an additional alternative of the shaft mounting. Here, as with FIG. 8, the motor 40 is provided with two structural units 20, which are connected to the control unit 41 through plug connections 42. However, in contrast to FIG. 8, the structural unit 20 turned away from the spinning pot 30 is not provided with an axial mounting with the permanent magnet 10. Thereby, the structural unit 20' is only able to actively generate a radial mounting of the shaft 7. The axial mounting is effected exclusively through the structural unit 20 turned towards the spinning pot 30, as described above.

FIG. 10 in turn shows an additional design of a shaft mounting. Here, the shaft 7 is axially and radially mounted with only one single structural unit 20. In contrast to the two preceding embodiments, the motor 40' here is able to generate radial forces in addition to the drive torque. Thereby, the shaft 7 is radially centered by the motor 40' in addition to the structural unit 20. Thereby, a second structural unit 20 or 20' is not necessary.

The invention is not limited to the embodiments shown here. Combinations of the individual characteristics with other embodiments in which they are not shown are always possible.

The invention claimed is:

1. A magnetic bearing for mounting a shaft of a spinning rotor of an open-end spinning device, comprising:
   a stator having a plurality of pole shanks that provide active radial magnetic mounting of the shaft in two degrees of freedom, each pole shank surrounded by a coil;
   the pole shanks radially arranged relative to each other in a manner to define an opening for the shaft, the pole shanks connected to each other adjacent the opening; and
   a permanent magnet arranged between the coils and the opening at a side of the coils facing the opening to provide passive axial mounting of the shaft.

2. The magnetic bearing according to claim 1, wherein the pole shanks form a stator cross.

3. The magnetic bearing according to claim 2, further comprising a stator ring that connects the pole shanks to each other at a side of the coils facing away from the opening.

4. The magnetic bearing according to claim 3, wherein the pole shanks are connected to each other adjacent to the opening for the shaft with saturation bars.

5. The magnetic bearing according to claim 1, wherein the permanent magnet is formed as a ring that surrounds the opening.

6. The magnetic bearing according to claim 1, further comprising a sensor that detects radial position of the shaft placed in the opening, the sensor in communication with a control device that controls current to the coils to actively control the two radial degrees of freedom of the shaft.

7. The magnetic bearing according to claim 1, wherein a radial distance of the permanent magnet from a center of the opening is larger than a radius of the opening.

8. The magnetic bearing according to claim 7, wherein the permanent magnet is arranged at a side of a guide ring facing the pole shanks, the guide ring guiding a generated electromagnetic flux.

9. The magnetic bearing according to claim 8, wherein an inner diameter of the guide ring corresponds essentially to a diameter of the opening.

10. The magnetic bearing according to claim 8, wherein a gap is provided in an axial direction of the shaft placed in the opening between the pole shanks and the guide ring.

11. The magnetic bearing according to claim 10, further comprising a filling ring placed in the gap.

12. The magnetic bearing according to claim 8, wherein a thickness of the pole shanks is less than a width of the guide ring facing towards the ferromagnetic component.

13. The magnetic bearing according to claim 8, further comprising the shaft placed through the opening, the shaft having a ferromagnetic ring connected thereto that is in flux communication with the pole shanks, the permanent magnet, and the guide ring.

14. The magnetic bearing according to claim 13, wherein the ferromagnetic ring comprises a groove facing towards the permanent magnet.

15. The magnetic bearing according to claim 14, wherein the groove is defined in the ferromagnetic ring between the pole shanks and the guide ring.

16. The magnetic bearing according to claim 1, further comprising a carrier, the stator, pole shanks, coils, and permanent magnet mounted on the carrier so as to form a compact structural unit with the carrier.

17. The magnetic bearing according to claim 16, further comprising a cover at an end of the structural unit to protect the magnetic bearing from dirt.

18. The magnetic bearing according to claim 17, further comprising a sensor that detects radial position of the shaft placed in the opening, the sensor in communication with a control device that controls current to the coils to actively control the two radial degrees of freedom of the shaft, and the structural unit further comprising a circuit board, the sensors and control device attached to the circuit board.

19. The magnetic bearing according to claim 18, wherein the circuit board comprises a plug connection that connects the circuit board to a superordinate circuit board for control and power supply.

20. The magnetic bearing according to claim 19, further comprising a shielding plate between the coils and the circuit board.

21. A shaft of an open-end spinning rotor for mounting with a magnetic bearing, wherein the magnetic bearing comprises
   a stator having a plurality of pole shanks that provide active radial magnetic mounting of the shaft in two degrees of freedom, each pole shank surrounded by a coil;

the pole shanks radially arranged relative to each other in a manner to define an opening for the shaft, the pole shanks connected to each other adjacent the opening; and a permanent magnet arranged between the coils and the opening at a side of the coils facing the opening to provide passive axial mounting of the shaft;

wherein the shaft is made of a non-ferromagnetic composite material and has a ferromagnetic component mounted thereon at a location corresponding to the opening of the magnetic bearing for radial or axial mounting of the shaft by the magnetic bearings.

22. The shaft according to claim 21, wherein the ferromagnetic component comprises a circumferential groove.

23. The shaft according to claim 22, wherein the groove faces towards the permanent magnet and aids in passive axial stabilization of the shaft.

24. The shaft according to claim 23, wherein the ferromagnetic component comprises a ring fitted over the shaft or a pin inserted into an end of the shaft.

25. The shaft according to claim 21, further comprising a rotor pot arranged at one end of the shaft.

26. A shaft mounting for a rotatable shaft of a spinning rotor in an open-end spinning device, wherein the shaft mounting comprises one or more of the magnetic bearings for passive axial mounting of one degree of freedom of the shaft and active radial mounting of two degrees of freedom of the shaft, the one or ore magnetic bearings comprising:

a stator having a plurality of pole shanks that provide active radial mounting of the shaft in two degrees of freedom, each pole shank surrounded by a coil;

the pole shanks radially arranged relative to each other in a manner to define an opening for the shaft, the pole shanks connected to each other adjacent the opening; and a permanent magnet arranged between the coils and the opening, at a side of the coils facing the opening to provide passive axial mounting of the shaft.

27. The shaft mounting according to claim 26, wherein a first one of the magnetic bearings is provided for passive axial mounting and active radial mounting of the shaft, and a second magnetic bearing without a permanent magnet is provided solely for active radial mounting of the shaft.

28. The shaft mounting according to claim 26, further comprising a drive motor configured with the shaft, the drive motor providing additional radial support to the shaft.

29. The shaft mounting according to claim 26, wherein each magnetic bearing is arranged in a compact structural unit along the shaft.

30. The shaft mounting according to claim 29, wherein multiple ones of the magnetic bearing structural units are connected by integrated circuit boards through plug connections to a superordinate circuit board for control and power supply.

* * * * *